(12) United States Patent
Trabold

(10) Patent No.: US 7,306,874 B2
(45) Date of Patent: Dec. 11, 2007

(54) PEM FUEL CELL STACK WITH COATED FLOW DISTRIBUTION NETWORK

(75) Inventor: Thomas A Trabold, Pittsford, NY (US)

(73) Assignee: General Motors Corporation, Detroit, MI (US)

( * ) Notice: Subject to any disclaimer, the term of this patent is extended or adjusted under 35 U.S.C. 154(b) by 299 days.

(21) Appl. No.: 10/717,938

(22) Filed: Nov. 20, 2003

(65) Prior Publication Data

US 2005/0112445 A1    May 26, 2005

(51) Int. Cl.
*H01M 8/02* (2006.01)
*H01M 8/10* (2006.01)

(52) U.S. Cl. .............. 429/38; 429/39; 429/44

(58) Field of Classification Search ........... None
See application file for complete search history.

(56) References Cited

U.S. PATENT DOCUMENTS

| | | | |
|---|---|---|---|
| 3,134,697 A | 5/1964 | Niedrach | |
| 5,272,017 A * | 12/1993 | Swathirajan et al. | 429/33 |
| 5,441,822 A | 8/1995 | Yamashita et al. | 429/34 |
| 5,445,904 A * | 8/1995 | Kaufman | 429/34 |
| 6,395,416 B1 * | 5/2002 | Tanemoto et al. | 429/34 |
| 6,500,893 B2 * | 12/2002 | Yamada et al. | 524/495 |
| 2003/0198857 A1 * | 10/2003 | McManus et al. | 429/38 |
| 2005/0095494 A1 * | 5/2005 | Fuss et al. | 429/39 |

OTHER PUBLICATIONS

International Search Report mailed Jan. 11, 2006 for PCT/US04/32987.

* cited by examiner

*Primary Examiner*—John S. Maples

(57) ABSTRACT

A fuel cell and a method for manufacturing a fuel cell including a membrane electrode assembly that includes an ionically conductive member and an electrode disposed at the ionically conductive member. Further, the fuel cell includes an electrically conductive member or gas diffusion medium that includes a flow field formed of conductive particles dispersed in a binder.

17 Claims, 7 Drawing Sheets

PEM FUEL CELL STACK WITH COATED FLOW DISTRIBUTION NETWORK

FIELD OF THE INVENTION

The present invention relates to proton exchange membrane (PEM) fuel cells and more particularly to such cells wherein a conductive material dispersed in a binder is disposed as a plurality of regions to form a flow field of fluid passages for an electrically conductive member.

BACKGROUND OF THE INVENTION

Although flow field plate technology has advanced significantly in the area of fuel cells, there are a number of inherent deficiencies associated with forming anode and cathode flow fields on a metallic or composite plate. First and foremost, the per-plate cost targets tend to be difficult to meet with any combination of material (stainless steel, aluminum, composite, etc.) and manufacturing method (etching, machining, stamping). Secondly, because the plates and the flow field "lands" are rigid, it is difficult to apply uniform compression across the plane of the stack with any presently existing compression method. Lastly, because of solid state contact at the flow field plate-diffusion media interface, cell performance is affected by the relatively large contact resistance in this location. As such, it is desirable for a flow field plate that eliminates the above enumerated drawbacks.

SUMMARY OF THE INVENTION

The present invention is directed to a fuel cell including a membrane electrode assembly that includes an ionically conductive member and an electrode disposed at the ionically conductive member. Further, the fuel cell includes an electrically conductive member such as a bipolar plate or gas diffusion medium that includes a flow field formed of conductive particles dispersed in a binder.

Moreover, the present invention is directed to a method of manufacturing a fuel cell which includes providing a membrane electrode assembly (MEA) including an ionically conductive member and at least one electrode, and providing at least one of an electrically conductive fluid distribution element and a current collector at a surface of the MEA. The method also includes forming a flow field including a plurality of channels that define a plurality of grooves on the electrically conductive fluid distribution element and the current collector, wherein the flow field includes a plurality of conductive particles dispersed in a binder.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
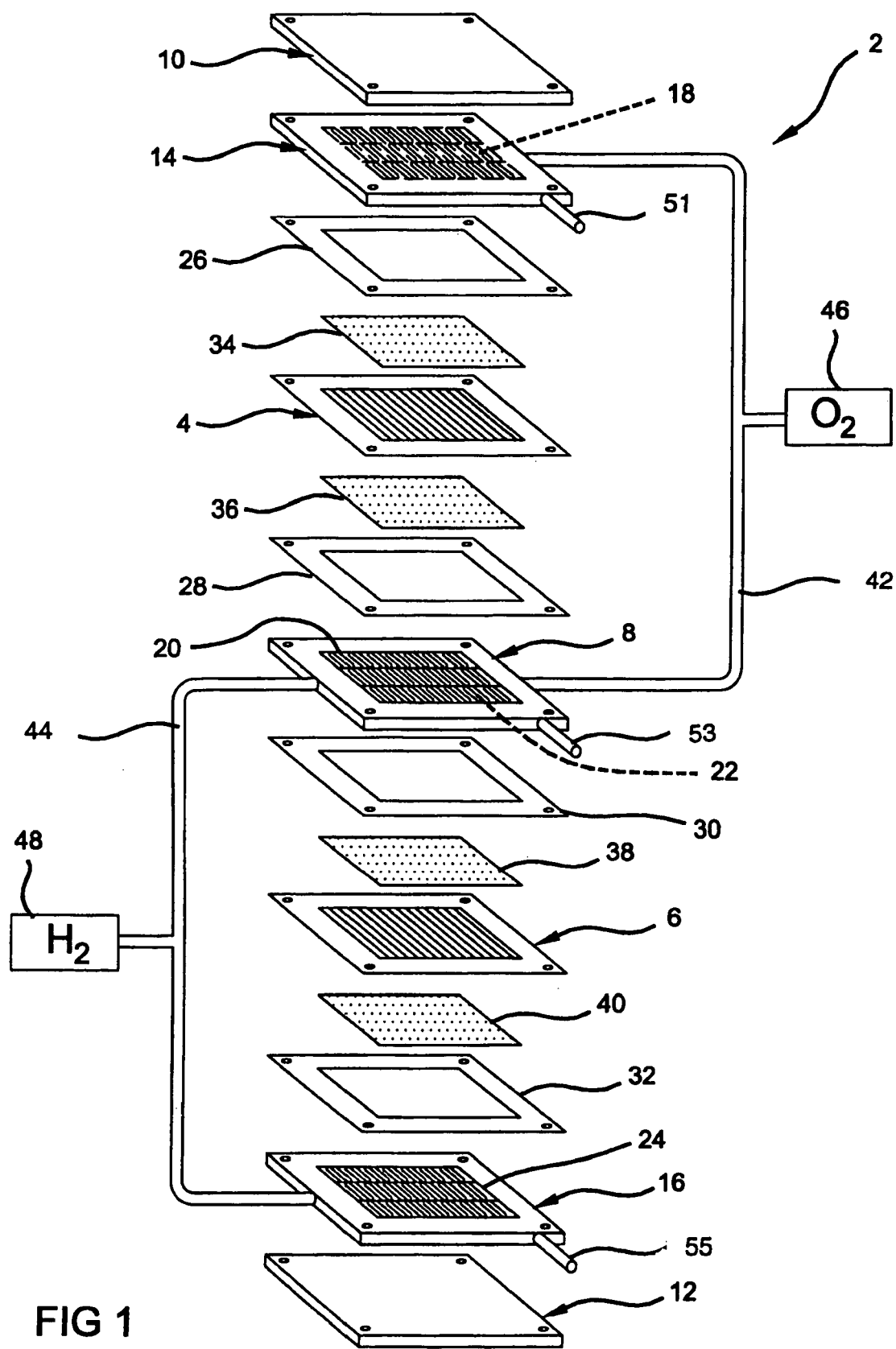
FIG. 1 is a schematic, exploded illustration of a PEM fuel cell stack (only two cells shown)

FIG. 1 generally depicts a two cell, bipolar fuel cell stack 2 having a pair of membrane-electrode-assemblies (MEAs) 4 and 6 separated from each other by an electrically conductive fluid distribution element 8, hereinafter bipolar plate 8. The MEAs 4 and 6 and bipolar plate 8, are stacked together between stainless steel clamping plates, or end plates 10 and 12, and end contact elements 14 and 16. The end contact elements 14 and 16, as well as both working faces of the bipolar plate 8, contain a plurality of grooves or channels 18, 20, 22, and 24, respectively, for distributing fuel and oxidant gases (i.e. $H_2$ and $O_2$) to the MEAs 4 and 6. Nonconductive gaskets 26, 28, 30, and 32 provide seals and electrical insulation between the several components of the fuel cell stack. Gas permeable conductive materials are typically carbon/graphite diffusion papers 34, 36, 38, and 40 that press up against the electrode faces of the MEAs 4 and 6. The end contact elements 14 and 16 press up against the carbon/graphite papers 34 and 40 respectively, while the bipolar plate 8 presses up against the carbon/graphite paper 36 on the anode face of MEA 4, and against carbon/graphite paper 38 on the cathode face of MEA 6. Oxygen is supplied to the cathode side of the fuel cell stack from storage tank 46 via appropriate supply plumbing 42, while hydrogen is supplied to the anode side of the fuel cell from storage tank 48, via appropriate supply plumbing 44. Alternatively, ambient air may be supplied to the cathode side as an oxygen source and hydrogen to the anode from a methanol or gasoline reformer, or the like. Exhaust plumbing (not shown) for both the $H_2$ and $O_2$ sides of the MEAs 4 and 6 will also be provided. Additional plumbing 51, 53, and 55 is provided for supplying liquid coolant to the bipolar plate 8 and end plates 14 and 16. Appropriate plumbing for exhausting coolant from the bipolar plate 8 and end plates 14 and 16 is also provided, but not shown.

Figure 2:
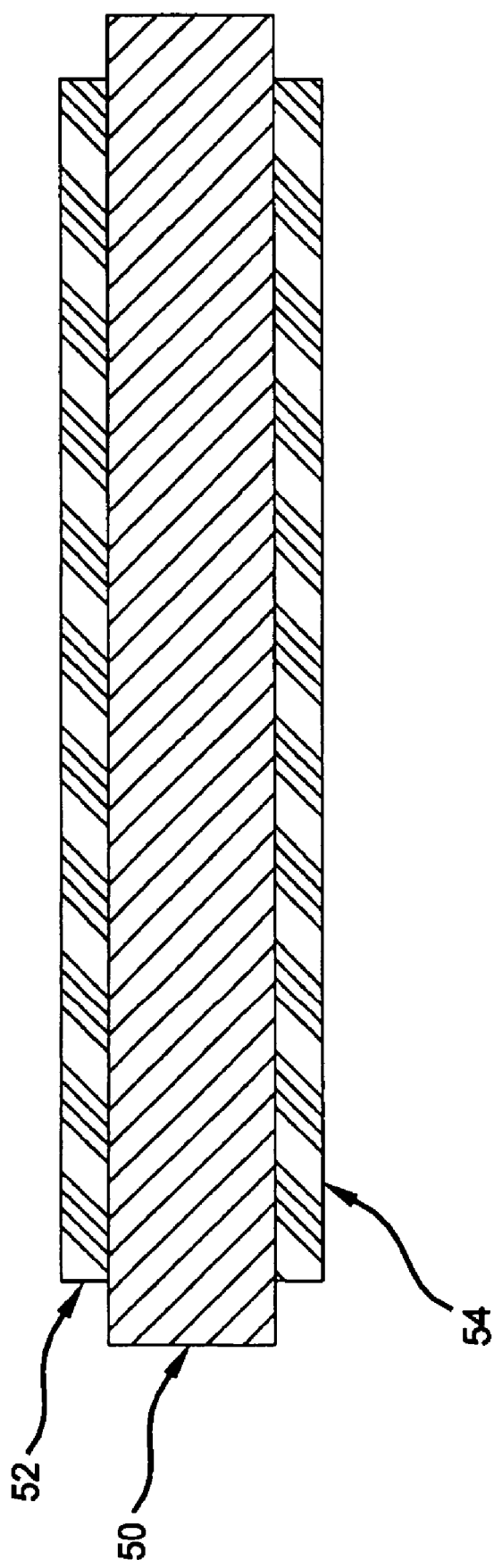
FIG. 2 is a cross-section of a membrane electrode assembly.

Each membrane electrode assembly (MEA) 4 and 6 includes an ionically conductive member 51 sandwiched by an anode electrode 52 and a cathode electrode 54 (FIG. 2). The ionically conductive member 50 is preferably a solid polymer membrane electrolyte, and more preferably a PEM. Polymers suitable for such membrane electrolytes are well known in the art and are described in U.S. Pat. Nos. 5,272,017 and 3,134,697 and elsewhere in the patent and non-patent literature. It should be noted, however, that the composition of the ionically conductive member 50 may comprise any of the proton conductive polymers conventionally used in the art. Preferably, perfluorinated sulfonic acid polymers such as NAFION® are used. Furthermore, the polymer may be the sole constituent of the membrane or may be carried in the pores of another material. The anode electrode 52 and cathode electrode 54 preferably comprise catalyst-coated carbon or graphite particles embedded in a polymer binder which, like the polymer membrane, is a proton conductive material such as NAFION®. Preferably, the catalyst is selected from the group consisting of platinum, palladium, platinum-ruthenium, Pt/transition-metal-alloys, and combinations thereof.

Figure 3:
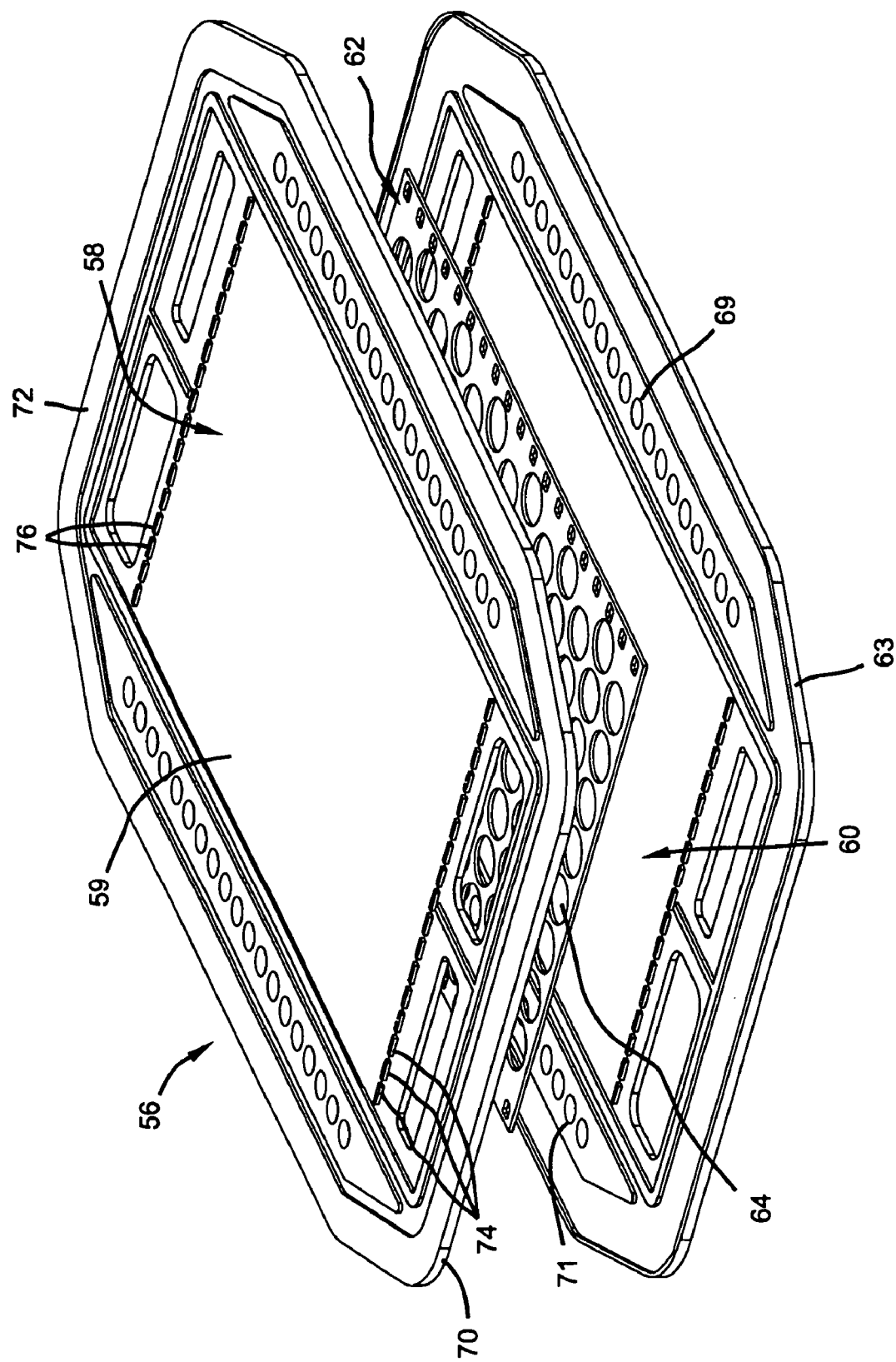
FIG. 3 is an exploded view of an exemplary electrically conductive fluid distribution element useful with the present invention.

FIG. 3 is a perspective view of an exemplary bipolar plate 56 that may be used in conjunction with the present invention. The bipolar plate 56 comprises a first exterior metal sheet 58, a second exterior metal sheet 60, and an interior spacer metal sheet 62 interjacent the first metal sheet 58 and the second metal sheet 60. The exterior metal sheets 58 and 60 are preferably flat and made as thin as possible. Further, the metal sheets 58 and 60 may be formed by any conventional process for shaping sheet metal.

Figure 4:
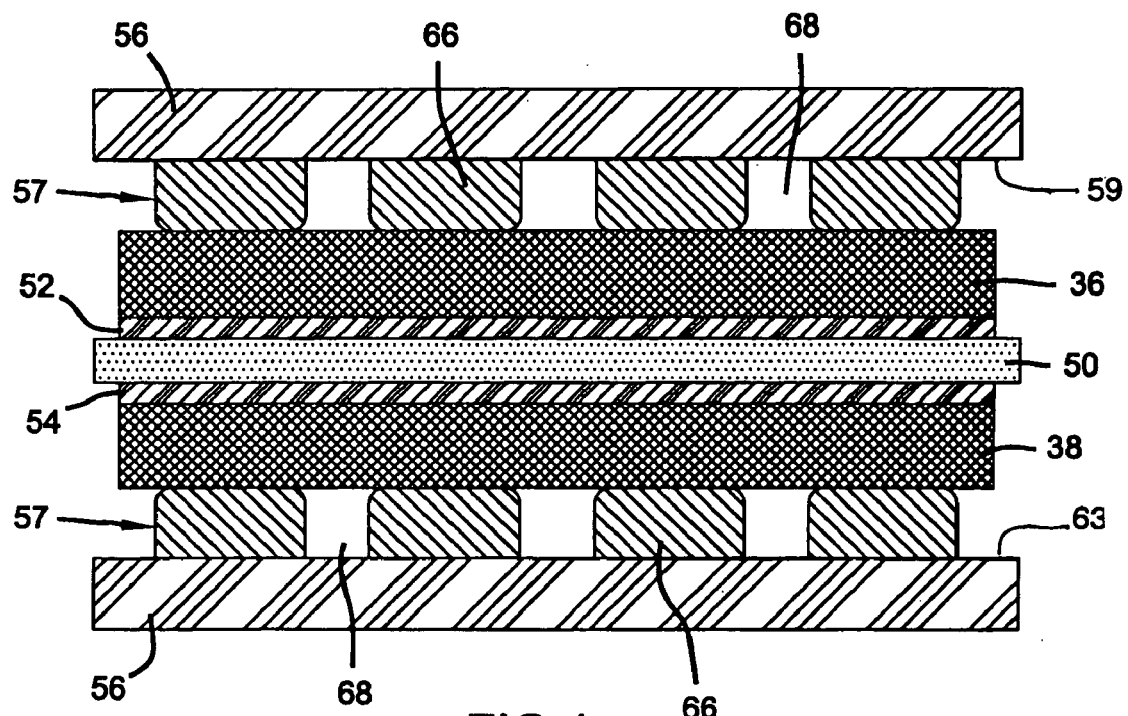
FIG. 4 is a cross-section of a fuel cell according to a first embodiment of the present invention.

The external sheet 58 has a first working face 59 on the outside thereof which confronts the membrane electrode assembly (not shown) and, in accordance with the present invention, will be modified to include a flow field 57 (FIG. 4). Metal sheet 60 is similar to sheet 58. Although not depicted in the Figures, it should be understood that there may be a plurality of ridges defining therebetween a plurality of channels through which coolant flows between sheets 58 and 60 from one side 69 of the bipolar plate 56 to the other side 71 thereof. Like sheet 58, the external side of the sheet 60 has a working face 63. Sheet 60 will also be modified so as to provide a flow field 57. The interior metal spacer sheet 62 is positioned interjacent the exterior sheets 58 and 60 and includes a plurality of apertures 64 therein to permit coolant to flow between the sheets 58 and 60 to thereby break laminar boundary layers and afford turbulence which enhances heat exchange with the inside faces of the exterior sheets 58 and 60, respectively.

Now referring to FIG. 4, a plurality of lands 66 which define therebetween a plurality of grooves 68 constitute the flow field 57 through which the fuel cell's reactant gases (i.e. $H_2$ or $O_2$) flow in a path from one side 70 of the bipolar plate 56 to another side 72 thereof. The lands 66 of the flow field 57 press against the porous material, carbon/graphite diffusion media 36 and 38 which, in turn, press against the MEA 4. As shown in FIG. 3, the reactant gas is supplied to the grooves 68 from inlet manifolds 74 that lie along one side 70 of the fuel cell and exits the grooves 68 via another array of manifolds 76 that lie adjacent the opposite side 72 of the fuel cell.

In accordance with the present invention, a material that is initially in a liquid state is applied, by an appropriate coating method, to form the flow field 57 that will facilitate distribution of the anode and cathode reactants over the plane of the active MEA surface. Preferably, the material that forms the lands 66 is a conductive material dispersed in a polymeric resin binder. In this regard, the conductive material is preferably comprised of carbon black and the polymeric binder is preferably polyimide. It should be understood, however, that any conductive material may be selected so long as it is not a material that will contaminate the fuel cell or create an adverse reaction within the fuel cell. Moreover, it should be understood that any material may be selected as the binder so long as the binder can withstand the harsh environment of the fuel cell. That is, the binder should be able to withstand an acidic, humid, and high temperature environment without any degradation of the binder.

Figure 6:
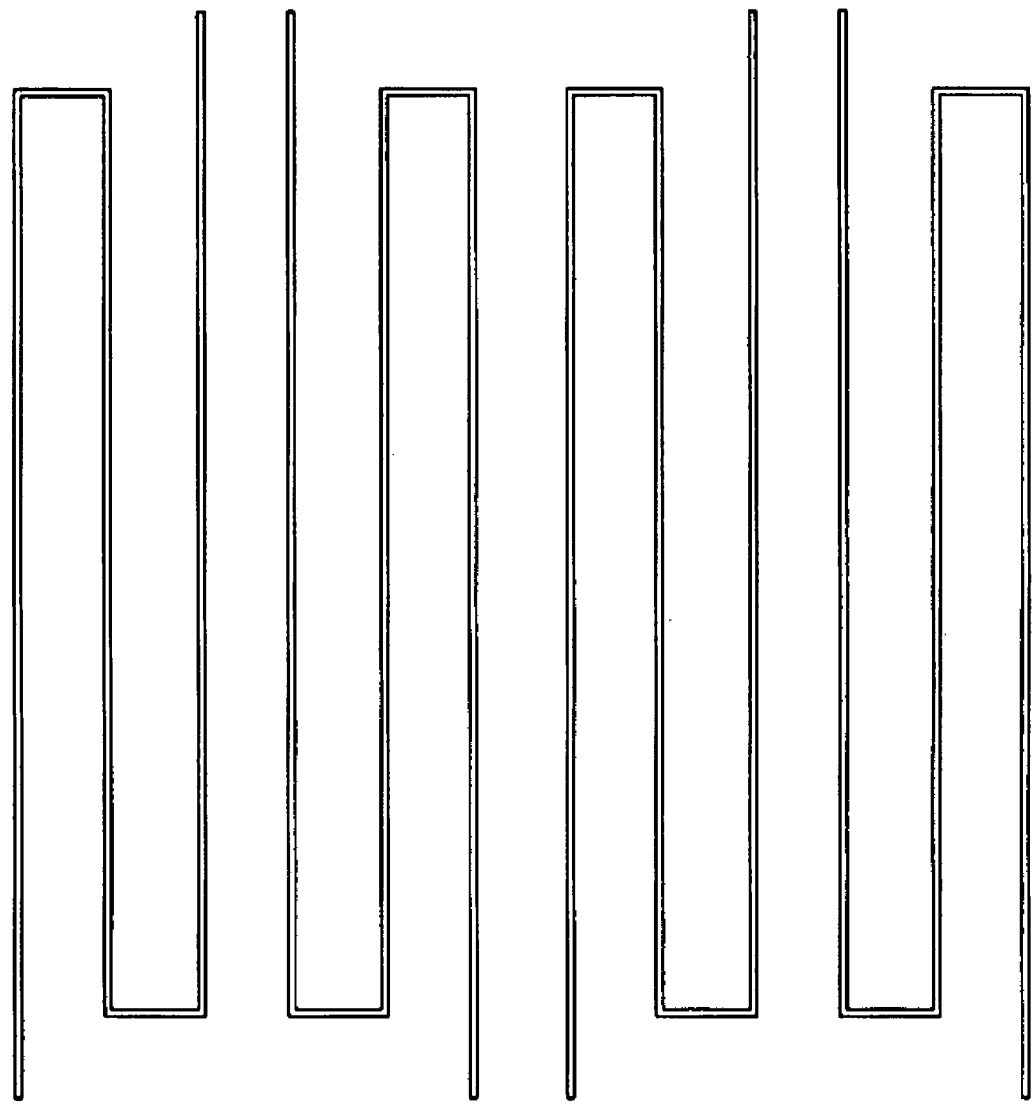
FIG. 6 is an example of a serpentine flow field that may be used in conjunction with the present invention.

According to a first embodiment of the invention, shown in FIG. 4, the flow field 57 is formed on the working faces 59 and 63 of the bipolar plates 56. More particularly, the lands 66 of the flow field 57 are disposed onto the working faces 59 and 63 of the bipolar plates 56 to form a plurality of grooves 68 for the gaseous reactants of the fuel cell to flow through. It should be understood that the geometry of the flow field 57 may be formed in any pattern desirable. That is, the flow field 57 may be formed in, for example, a serpentine pattern 77 where the lands 66 and grooves 68 of the flow field 57 meander back and forth across the surface of the bipolar plates 56 (FIG. 6), or in a more simplistic fashion where the grooves 68 merely traverse the surface of the bipolar plates 56 from one edge to another.

Since the lands 66 of the flow field 57 are formed of a conductive material dispersed in a polymeric binder, the lands 66 are not as rigid as those of a conventional bipolar plate formed from stamping, molding, or the like. As such, when the components of the fuel cell are fully assembled, the lands 66 may compress which thereby reduces compression pressures needed to maintain a satisfactory current density. That is, in order to facilitate a satisfactory current density from the reaction of the fuel cell, the components of the fuel cell are compressed together at high pressure in order to ensure an electrical connection between the components that will not fail. This high compression pressure, however, may damage the sensitive components of the cell such as those included in the membrane electrode assembly 4. As the lands 66 of the flow field 57 of the present invention are not as rigid, compression pressures may be kept to a minimum and, therefore, damage to the sensitive components of the cell may be avoided.

Furthermore, when high compression pressures are used in a conventional cell, a contact resistance may develop. Since high compression pressures may be alleviated when employing the present invention, lower contact resistances may also be achieved which further increases the fuel cell's overall performance, as well as increases the current density. This is achieved in that the lands 66 include at least 50 percent of the conductive particles and at least 50 percent of the polymeric binder. By utilizing at least 50 percent of the conductive particles, particle to particle contact is ensured in the lands 66 and electrical conductivity may be facilitated. Moreover, by utilizing at least 50 percent of the polymeric binder which is thermally conductive, the heat that is produced as a by-product of the overall reaction of the fuel cell may be dissociated accordingly. As such, the overall performance and life of the fuel cell is further enhanced.

Figure 5:
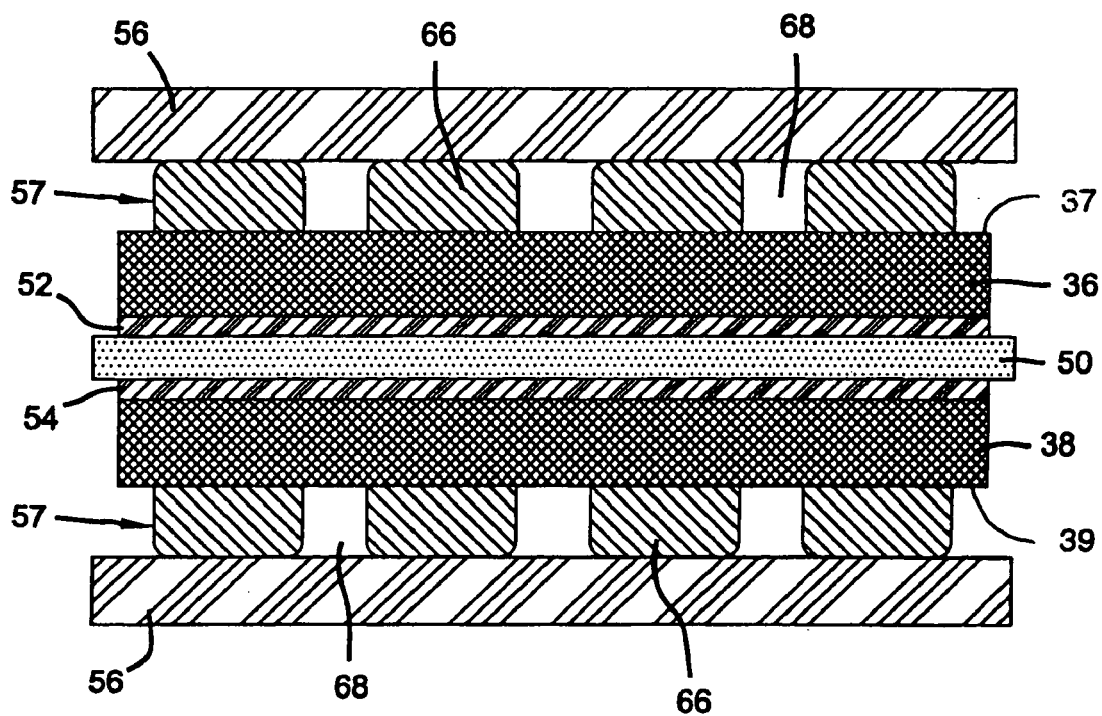
FIG. 5 is a cross-section of a fuel cell according to a second embodiment of the present invention.

Now referring to FIG. 5, a second embodiment of the present invention will be described. According to the second embodiment, the lands 66 of the flow field 57 are formed on surfaces 37 and 39 of the current collectors, or gas diffusion media 36 and 38, that face away from the MEA 4. The gas diffusion media 36 and 38 may be any gas diffusion media known in the art. Preferably, the gas diffusion media 36 and 38 are carbon papers, carbon cloths, or carbon foams with a thickness of in the range of about 100-300 μm.

As was the case in the first embodiment, it should be understood that the geometry of the flow field 57 may be formed in any pattern desirable or contemplated. That is, the flow field 57 may be formed in, for example, a serpentine pattern 77 where the lands 66 and grooves 68 of the flow field 57 meander back and forth across the surfaces 37 and 39 of the diffusion media 36 and 38 (FIG. 6), or in a more simplistic fashion where the grooves merely traverse the surfaces 37 and 39 of the diffusion media 36 and 38 from one edge to another. Further, it should be noted that although the flow field 57 is disposed on the surface of the diffusion media 36 and 38, it is preferable to still utilize a cooled flat plate 56. In this manner, the temperature of the fuel cell may be controlled to a desirable and efficient temperature. Moreover, as was the case in the first embodiment, the lands 66 are not as rigid as those of a conventional bipolar plate formed from stamping, molding, or the like, and therefore, the lands 66 may compress which thereby reduces compression pressures needed to maintain a satisfactory current density. Still further, since high compression pressures are alleviated, lower contact resistances may also be achieved which further increases the fuel cell's overall performance, as well as increases the current density. As such, the overall performance and life of the fuel cell is further enhanced.

Figure 7:
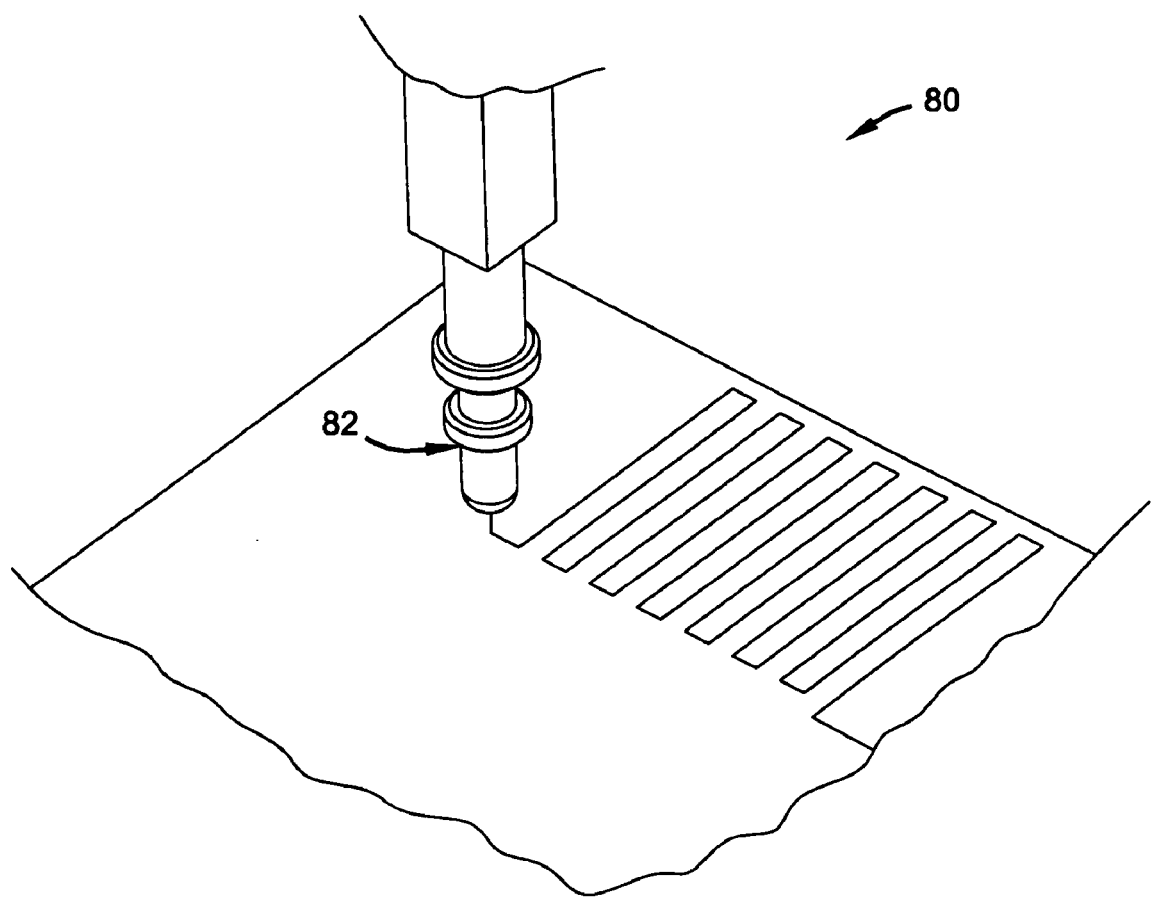
FIG. 7 is a perspective view that exemplifies the direct writing technique that may be used in conjunction with the present invention.

One possible way of applying the flow distribution network material to either the bipolar plate 56 or diffusion media 36 and 38 is by use of a "direct writing" technique 80 which employs a thin nozzle tip 82 to apply fluids over a wide range of coating widths and thicknesses (FIG. 7). A manufacturer of this type of device is MicroPen, Inc. which is a subsidiary of Ohmcraft, Inc. in Honeoye Falls, N.Y. The use of such a direct writing technique 80 enables the ability to write lines of the conductive pastes with tight tolerances. More specifically, the direct writing technique 80 produces lines (lands 66) that may range from 0.025" to 0.25" in width with spaces (grooves 68) as thin as 0.0005" with tolerances of ±0.00025". Moreover, the direct writing technique 80 can deposit the lands 66 from 0 to 0.010" thickness per pass with tolerances of ±0.000025" and write at speeds from 0.05" to 5.0" per second. Further, such a technique allows coating of materials of essentially any viscosity, from water (1 cP) to putty (>100,000 cP). With such a wide-reaching ability to coat with essentially any fluid viscosity, a great deal of latitude is granted in designing material packages that can be used to form the aforementioned lands 66 of the flow fields 57. It should also be noted and understood that design of the coating pattern can be input to the MircoPen from an electronic drawing. Hence, producing complicated patterns, corresponding to flow field plate grooves 68 or other geometries of interest, can be accomplished simply by loading an associated AutoCad drawing, for example.

Still further, because of the MicroPen's ability to coat fluids with a wide range of physical properties, the material used to form the flow fields 57 (FIGS. 4 and 5) can be "fine tuned" to satisfy specified functional requirements. For instance, to replace the traditional flow fields 57 formed in the bipolar plates (by machining, stamping, etching, etc.), the coated material has characteristics such as high electrical and thermal conductivity to facilitate electron transfer to the cooled flat plate 56 and effectively transfer heat from the cell. Moreover, the material may be fine tuned to provide a degree of compliance that reduces contact resistance, reduces compressive load, and makes the stack assembly much less sensitive to non-uniformities in compressive load applied to using end plates 10 and 12 and/or edge compression.

A preferable method of disposing the flow field 57 is to utilize the direct writing technique 80 in conjunction with a so-called decal method as is well known in the art. In the decal method, a slurry of the conductive particles, polymeric binder and a casting solvent is applied evenly over a Teflon blank. The Teflon blank is then baked in an oven and subsequently hot-pressed to a substrate. The Teflon blank is then peeled from the substrate and the conductive particles dispersed in the polymeric binder remains.

For purposes of applying the flow field 57 of the present invention to either a bipolar plate 56 or diffusion media 36 and 38, the direct writing technique 80 is used to apply a slurry of the conductive material onto the Teflon blanks at the desired widths and thickness in the desired pattern for the lands 66 of the flow field 57. An exemplary slurry for purposes of the present invention may comprise, but should not be limited to about 20% carbon black, 20% polymeric binder, 30% isopropyl alcohol and 30% water. After the slurry has been disposed onto the Teflon blanks in the desired pattern, the blanks are oven dried at 80° C. for 5 minutes. The Teflon blanks are then hot pressed onto a surface of the bipolar plate 56 or diffusion media 36 and 38 at a temperature of 146° C. and pressure of 400 psig. Subsequently, the Teflon blanks are removed and the flow field 57 remains disposed on the bipolar plate 56 or diffusion media 36 and 38.

It should be understood that although the above described method is preferable, the present invention should not be limited thereto. For example, a number of direct writing devices may be employed at the same time to dispose the flow field 57. Furthermore, it should be understood that depending on the varying amounts and constituents of the slurry, different pressures and temperatures may be needed for the baking and hot pressing steps. Another possible variation may be to deposit the flow field 57 directly onto the bipolar plate 56 or diffusion media 36 and 38 with the direct writing technique 80.

Furthermore, other methods of disposing the flow field 57 onto the bipolar plate 56 or diffusion media 36 and 38 include an extrusion method and a mask method. With respect to the extrusion method, a slurry of the conductive particles and polymeric binder may be extruded onto a Teflonated blank in a desired pattern, similar to the direct writing technique 80, and then hot-pressed onto the bipolar plate 56 or diffusion media 36 and 38 or extruded directly onto the bipolar plate 56 or diffusion medium 36 and 38. In such a method, the thickness and width of the grooves 68 of the flow field 57 may also be independently controlled.

In the mask method, a mask with the desired flow field pattern may be disposed over either the Teflonated blank, bipolar plate 56, or diffusion media 36 and 38 and then the slurry of conductive particles and polymeric binder may be rolled onto the surface with a roller or the like. Further, the slurry may be disposed by a draw bar method or any other method of disposing the slurry known in the art. Subsequent to the slurry being applied according to the deposition method chosen, the mask is removed and the lands 66 of the flow field 57 will remain.

It should be understood that in any of the above-mentioned applications, the thickness or height of the lands 66 of the flow field 57 may be varied. That is, each of the components of the fuel cell will be subjected to varying pressures throughout the cell due to each component consisting of varying thicknesses and dimensional areas. As such, compression pressures will also vary throughout the cell. Prior to application of the flow field 57 to either the bipolar plate 56 or diffusion media 36 and 38, these areas of varying pressures can be determined with various testing methods. Once these areas are determined, the thickness of the lands 66 of the flow field 57 may be varied along the surface of the bipolar plate 56 or diffusion media 36 and 38 to even out or transfer pressures to corresponding points of reduced or increased pressure in the cell. For instance, in areas where the stack compression is known to be relatively low (resulting in locally high contact resistance), the thickness of the coated lands 66 can be made larger in that local region. Conversely, in areas where the stack compression is known to be relatively high (resulting in locally low contact resistance), the thickness of the coated lands 66 can be made thinner in that local region. In such a manner, the contact resistance and stack compression can be kept uniform throughout the fuel cell to facilitate optimum performance and longevity.

Figure 8:
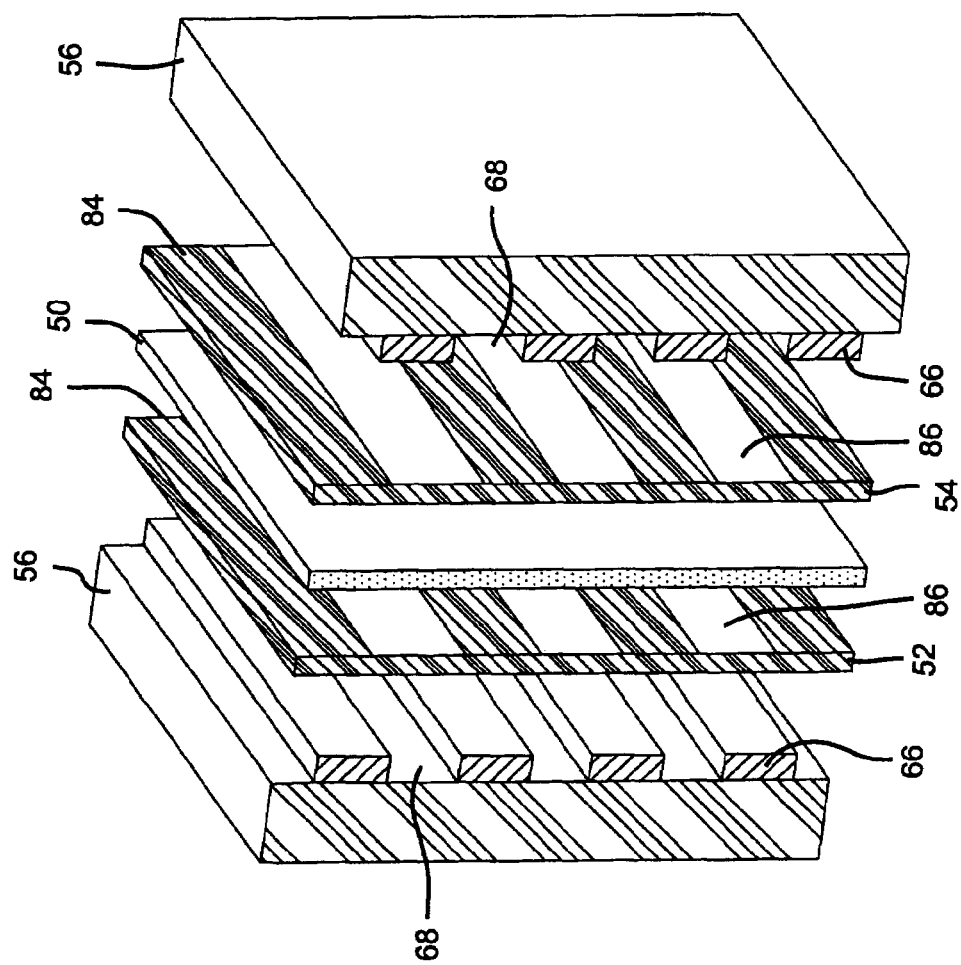
FIG. 8 is an exploded view of a fuel cell according to a third embodiment of the present invention.

Now referring to FIG. 8, a third embodiment of the present invention is illustrated whereby the anode and cathode electrodes 52 and 54 are comprised of alternating regions 84 and 86 of catalytic and non-catalytic material. As shown in FIG. 8, the alternating regions 84 and 86 of catalytic and non-catalytic material are aligned with corresponding grooves 68 of the flow field 57 disposed on the bipolar plate 56. By confining the catalytic material to the regions 84 aligned with the flow field grooves 68, the need for the diffusion media may be eliminated. An extension of this concept is to coat the flow field directly onto the non-catalytic regions 86 to form the flow grooves 68 for anode and cathode reactants. Such a design would combine all the fuel cell "software" into a single structure and subsequently, the stack would be assembled by placing these structures between cooled flat plates. In this manner, factors such as stack compression and contact resistance can be further controlled and optimized.

Moreover, since the lands 66 of the bipolar plates 56 directly contact the non-catalytic regions 86 of the anode 52 and cathode 54, which are also electrically conductive, when a fuel stream of pure $H_2$ or hydrogen reformate is dispersed over the electrochemically active regions 84 of the anode 52, electrons that are produced by the hydrogen oxidation reaction are laterally conducted a short distance through the electrochemically active regions 84 to the adjacently disposed electrically conductive regions 86. Since the lands 66 of the bipolar plate 56 directly contact the electrically conductive regions 86 of the anode 52, electrical conductivity is facilitated and enhanced. Protons ($H^+$) produced from the anodic reaction, combined with water from the humid fuel stream pass through the electrochemically active regions 84 to the ionically conductive member 50 and through to the cathode 54.

A stream of $O_2$ or ambient air that contains oxygen is dispersed over the electrochemically active regions 84 of the cathode 54. The oxygen undergoes a reduction reaction and the electrons that are produced are also laterally conducted a short distance through the electrochemically active regions 84 to the adjacent electrically conductive regions 86. The reduced oxygen then reacts with the protons from the anode 52 and liquid water is produced.

It should be understood that since the electrochemically active regions 84 essentially correspond to or align with the grooves 68 and have widths less than the widths of the grooves 68, water produced from the electrochemical reaction of the fuel cell will preferentially not form on the lands 66 and will essentially be confined to the grooves 68. Accordingly, the water in the grooves 68 is in contact with the high velocity air stream which will convectively remove the water from the fuel cell.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell comprising:
    a membrane electrode assembly including an ionically conductive member and at least one electrode disposed at said ionically conductive member;
    an electrically conductive member adjacent said electrode, wherein said electrically conductive member comprises a metal plate having a major surface; and
    a flow field comprising conductive particles dispersed in a binder wherein said flow field is defined by lands patterned on said major surface of said electrically conductive member.

2. The fuel cell of claim 1, wherein the conductive particles are electrically conductive.

3. The fuel cell of claim 1, wherein the conductive particles are thermally conductive.

4. The fuel cell of claim 1, wherein the conductive particles are selected from the group consisting of carbon black, graphite, gold, and platinum.

5. The fuel cell of claim 1, wherein the binder is selected from the group consisting of polyimide, polyester, and epoxy.

6. The fuel cell of claim 1, wherein said major surface of said plate faces said electrode, a gas diffusion medium is disposed between said major surface and said electrode, and said lands of said flow field abut said gas diffusion medium.

7. The fuel cell of claim 6, wherein said gas diffusion medium is selected from the group consisting of carbon papers, carbon cloths, and carbon foams.

8. The fuel cell of claim 6, wherein said plate further comprises a material selected from the group consisting of composite and polymeric materials.

9. The fuel cell of claim 1, wherein the flow field comprises a plurality of lands that define a plurality of grooves therebetween; and the lands of the flow field include about 50 percent of conductive particles and about 50 percent of binder.

10. The fuel cell of claim 6, wherein a height of at least two of said lands varies between regions of the major surface of said electrically conductive member.

11. The fuel cell of claim 10, wherein the height varies between regions of said major surface according to compressive force exerted at said region respectively.

12. The fuel cell of claim 10, wherein the height is lower in a first said region which is under relatively high compressive force and the height is higher in a second said region which is under relatively low compressive force.

13. The fuel cell of claim 1, wherein variation in contact resistance between said regions is minimized by the height varying between said regions.

14. The fuel cell of claim 1, wherein said electrically conductive member comprises a gas diffusion medium having said major surface with said flow field pattern.

15. The fuel cell of claim 14, wherein the gas diffusion medium is selected from the group consisting of carbon papers, carbon cloths, and carbon foams.

16. The fuel cell of claim 14, wherein said major surface of said gas diffusion medium faces away from said electrode and a current collector plate abuts said lands defined on said major surface of said gas diffusion medium.

17. The fuel cell of claim 1, wherein said at least one electrode comprises a plurality of alternating catalytic regions and non-catalytic regions, wherein the non-catalytic regions are aligned with said lands of said flow field.

* * * * *